(No Model.) 2 Sheets—Sheet 2.
H. A. HOUSE.
COUPLING DRIVING SHAFTS.
No. 590,616. Patented Sept. 28, 1897.
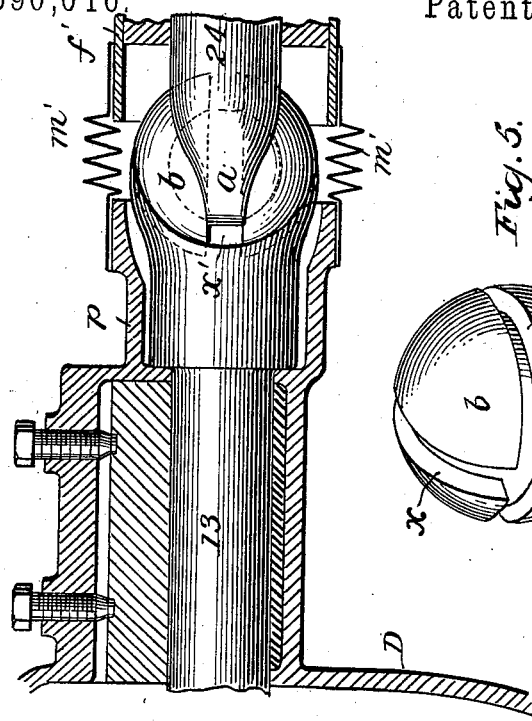
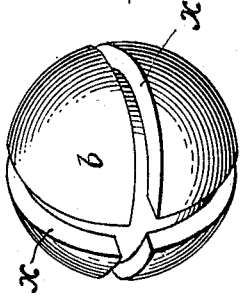
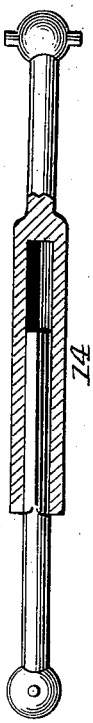
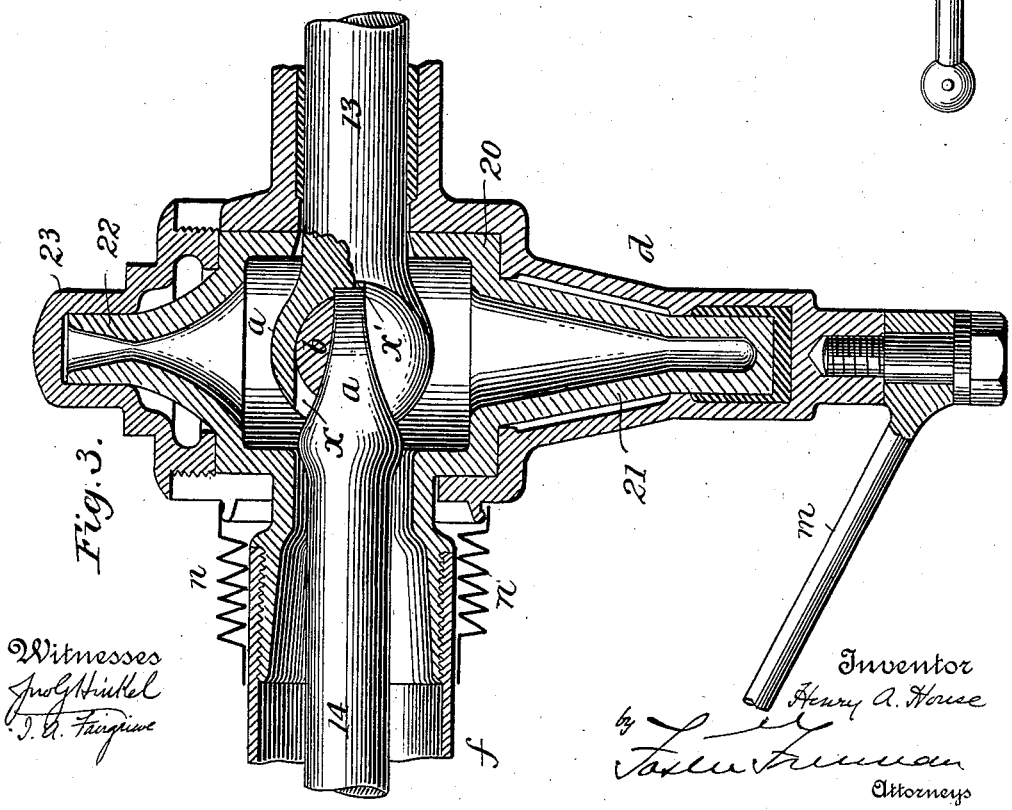
Witnesses
Jno. G. Hinkel
J. A. Fairgrieve
Inventor
Henry A. House
by
Attorneys
THE NORRIS PETERS CO., PHOTO-LITHO., WASHINGTON, D. C.

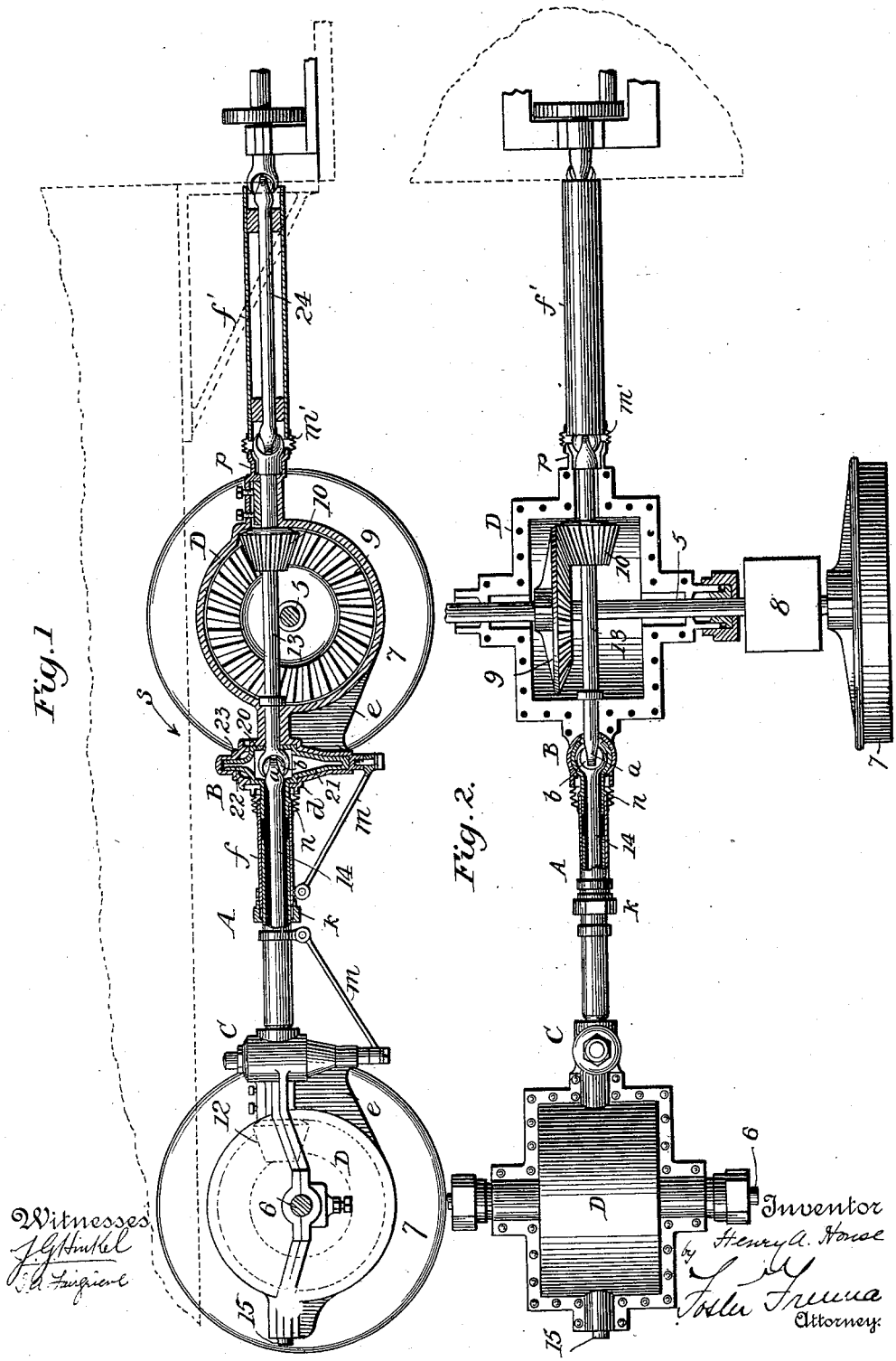

UNITED STATES PATENT OFFICE.

HENRY A. HOUSE, OF BRIDGEPORT, CONNECTICUT.

COUPLING DRIVING-SHAFTS.

SPECIFICATION forming part of Letters Patent No. 590,616, dated September 28, 1897.

Application filed March 19, 1895. Serial No. 542,404. (No model.)

*To all whom it may concern:*

Be it known that I, HENRY A. HOUSE, a citizen of the United States, residing at Bridgeport, in the county of Fairfield and State of Connecticut, have invented certain new and useful Improvements in Coupling Driving-Shafts, of which the following is a specification.

Difficulty has been experienced in coupling together the axles of locomotives and motor-cars and vehicles, so that one shall be driven from the other, because of the amount of play which is a necessary incident to the bearings of all axles in such structures and also because of the necessity in many instances of mounting axles upon separate pivoted trucks or bearings to permit the axles to assume an angle to each other when turning curves.

The object of my invention is to remedy these difficulties and to provide means whereby without unduly limiting any of the independent movements of the axles power may be transmitted through the medium of gearing from one to the other; and to this end I make use of an arrangement of coupled shaft-sections, driving-gear, and self-accommodating bearings, as fully set forth hereinafter and as illustrated in the accompanying drawings, in which—

Figure 1 is a sectional elevation showing two car-axles and their coupling devices embodying my invention. Fig. 2 is a part sectional plan. Fig. 3 is an enlarged sectional elevation of one of the couplings and bearings; Fig. 4, an enlarged sectional elevation of another of the couplings and bearings. Fig. 5 is a perspective view, and Fig. 6 is a modification.

A series of axles or shafts may be coupled in accordance with my invention. In the drawings are shown two shafts or axles 5 6, carrying flanged car-wheels 7 and turning in the usual boxes 8, supported in the brackets of a tram-car, locomotive, or other vehicle.

Upon each of the axles is fixed a beveled gear-wheel 9, gearing with a beveled pinion 10 or 12 upon a flexible shaft consisting of a series of sections and extending horizontally in a plane above or below that of the axles 5 6, as is necessary in order that the beveled pinions 10 12 may be arranged to drive the shafts simultaneously. In such case of course the teeth of the gears are arranged at an angle instead of being directly radial as in regular gears.

Each shaft A is shown as consisting of three sections 13 14 15 between the pinions 10 12, the section 13 carrying the pinion 10 and being coupled at one end by a universal coupling B with the adjacent end of the section 14, and the other end of the latter being coupled by a universal coupling C with the proximate end of the section 15. These couplings B C may be of any suitable character, but preferably are so constructed as not only to permit of the flexion incident to ordinary universal couplings, but also to permit of an independent longitudinal movement of the sections. An effective construction to this end consists in providing each of the adjacent ends of the sections with a fork $a$, extending into an annular groove $x$ or $x'$ in a sphere $b$, the grooves $x$ $x'$ being in the periphery of the sphere and at right angles to each other, as shown in Figs. 3 and 4, so that when one section is turned it will carry the sphere with it, the rotation of the sphere turning the other section, while the forks can slide in the grooves to permit independent longitudinal movements of the sections.

Where it is desired to employ an ordinary universal coupling, which does not permit the longitudinal movement of the sections, the section 14 may consist of two parts, one with an angular socket receiving the angular end of the other, as shown in Fig. 6.

The coupled sections may be supported in different ways, but it is most desirable to so support them in bearings of such a character that the tendency of one pinion to rise up upon the wheel with which it is geared and to tilt the bearing in which its shaft is mounted shall be counteracted by the corresponding tendency of the other pinion. To this end I make use of a jointed support which will accommodate itself to the changes in vertical and angular positions of the axles and to their movements to and from each other. Thus the section 13 turns in bearings in a frame in the form of a case D, which is in two half-sections flanged and clamped together with bearings to receive an axle, upon which the casing can swing freely, and with other bearings to receive the journal portions of the section of the shaft A, the said casing inclosing the gears and adapted to contain a body of oil by which the gears may be lubricated and the sound deadened. The casing D is prolonged at one end to form a subcasing or box $d$ for receiving the coupled ends of the sections and open at the inner ends to receive the neck of a tube $f$, having at the ends a hollow cylindrical bearing 20, adapted to a corresponding bearing in the side of the box $d$, the section 13 or 15 extending into the end of the tube. The cylindrical end bearing 20 of the tube $f$, which incloses the section 14 of the shaft, permits the said section to assume any desired angle upon a horizontal plane, and while it is desirable to permit one axle to rise or fall independently of the other it is not desirable that one of the sections 13 or 15 shall assume an angle in a vertical plane to the intermediate section 14 of the shaft. Therefore, to maintain these sections as nearly as possible in the same longitudinal plane I elongate the bearing 20 by adding a conical extension 21, adapted to a corresponding extension of the box $d$ and bearing therein, as best shown in Fig. 3, the said extension $d$ being strengthened by means of a web $e$, connecting with the main casing. I thus secure a bearing for the end of the tube $f$, which, while it permits the latter to move laterally and permits the section 14 to assume an angle in a lateral direction to the section to which it is coupled, tends to hold the tube $f$ and the box $d$ in their relative positions, so that the coupled sections cannot assume an angle to each other in a vertical plane. The upper part of the cylindrical bearing 20 is provided with an extension 22, open at the top to permit oil to be supplied to the interior of the coupling and having its bearing in a detachable cap 23, which aids in maintaining the parts in position against independent vertical play. In order to accommodate the tube $f$ to varying distances between the axles, I make it in two sections, one sliding within the other, as shown, and extending through a packing-box $k$, which excludes dust and prevents the escape of oil when the coupling-casings are filled with oil, and the tube is braced by braces $m$, extending from each section to the bottom of the box $d$. To further exclude dust from the boxes of the couplings B C, I prefer in some cases to extend an accordion-sleeve $n$ from the opening in the box $d$, through which the tube $f$ passes, to the tube, as shown in Fig. 3, the said sleeve extending and contracting according to the movements of the parts.

If a motor was upon one of the axles—say upon the axle 5—power would be transmitted therefrom, through the gears and sectional shaft A, to the other axle 6. When, however, the motor is not upon or geared directly to either axle, power is transmitted from another shaft or shaft-section 24, which may be coupled to the end of the section 13 by a coupling similar to the coupling B or C and which may extend through a tube $f'$, an accordion-sleeve $m'$ extending from the end of the tube $f'$ to an annular flange $p$ upon the casing D and excluding dust from the coupler.

It will be seen that if the pinion 10 is turned in the direction of its arrow, Fig. 1, it tends to travel upward on the gear 9 and to tilt or swing the casing D at the inner end downward in the direction of the arrow $s$, but that the pinion 12 also tends to travel upward upon its gear and to lift the inner end of its casing in a reverse direction, so that one action counteracts the other and maintains the parts of the bearing-casing in equilibrium.

It will be evident that by the construction above described one axle may move vertically independently of the other, carrying with it one end of the bearing-casing, the other end of which merely swings upon the opposite axle without the intermediate parts of the casing or the sections of the shaft A being carried out of alinement, that either axle may be carried to or from the other without any straining of the parts or may swing in a horizontal plane at an angle to the other, and that all of the connected parts are so fully connected as practically to exclude dust, but without increasing the friction upon the bearing.

Without limiting myself to the precise construction and arrangement of parts shown, I claim as my invention—

1. The combination with two parallel independently-movable shafts or axles, of gears thereon, an intermediate shaft in section, gears on the sections engaging with the gears on the axles, couplings connecting the sections of the intermediate shaft whereby the said sections may be swung in an angular relation upon a horizontal plane, swinging bearings on which the couplings are supported and means for preventing the shaft-sections assuming angular relation with respect to each other in a vertical plane, substantially as described.

2. The combination of independently-movable shafts or axles, connected sectional shaft and gears, universal couplings, and casings swinging upon the axles inclosing the gears, and provided with boxes inclosing the couplings, an intermediate extensible tube inclosing the intermediate section of the sectional shaft and jointedly connected with the said boxes, substantially as set forth.

3. The combination with the independently-movable axles, sectional shaft and gears, of a casing D inclosing the gears of one axle and having bearings for one of the shaft-sections, an elongated box connected with the casing and receiving the end of said shaft-section and an extensible tube receiving the intermediate shaft-section, and having a terminal cylindrical end bearing fitting the interior of the box, substantially as set forth.

4. The combination with the casing D and coupled shaft-sections 13, 14, of a tube $f$ having a cylindrical end bearing elongated vertically, and a box connected with the casing D and adapted to receive the said end bearing, substantially as set forth.

5. The combination with two parallel independently-movable shafts or axles, of gears thereon, an intermediate shaft in section, gears on the sections engaging with the gears on the axles, couplings connecting the sections of the intermediate shaft whereby the said sections may be swung in an angular relation upon a horizontal plane, swinging bearings on which the couplings are supported, means for preventing the shaft-sections assuming angular relation in a vertical plane with respect to each other, and means whereby elongation and contraction of the intermediate shaft is permitted, substantially as described.

6. A coupling for driving-shafts, comprising two or more movable shafts or axles, a sectional power-shaft connected with said shafts or axles to drive the same, couplings between the sections of the power-shaft whereby elongation and contraction of said shaft is permitted, swinging bearings for the power-shaft, a rigid closed casing surrounding the power-shaft, and devices connected to the casing and to the swinging bearings adapted to expand and contract to conform to the elongation and contraction of said shaft, all of the parts between the shafts or axles being arranged in the same plane, substantially as described.

7. The combination with two independently-movable shafts or axles, of bevel-gears thereon, an intermediate shaft in sections, bearings for said sections, pinions on the sections engaging the gears on the independently-movable shafts, universal couplings connecting the intermediate shaft-sections whereby elongation and contraction of said shaft is permitted, a rigid tube surrounding the intermediate shaft-sections and flexible connections between the tube and the section-bearings adapted to expand and contract to conform to the elongation and contraction of the said shaft, substantially as described.

In testimony whereof I have signed my name to this specification in the presence of two subscribing witnesses.

HENRY A. HOUSE.

Witnesses:
GEORGIA P. KRAMER,
A. N. DOBSON.